(12) United States Patent
Goyal et al.

(10) Patent No.: US 10,959,050 B2
(45) Date of Patent: Mar. 23, 2021

(54) ACTION BASED OBJECT LOCATION SYSTEM

(71) Applicant: International Business Machines Corporation, Armonk, NY (US)

(72) Inventors: Munish Goyal, Yorktown Heights, NY (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/393,941

(22) Filed: Apr. 24, 2019

(65) Prior Publication Data

US 2020/0344571 A1 Oct. 29, 2020

(51) Int. Cl.
*H04W 4/024* (2018.01)
*G06N 20/00* (2019.01)
*H04W 4/029* (2018.01)

(52) U.S. Cl.
CPC .......... *H04W 4/024* (2018.02); *G06N 20/00* (2019.01); *H04W 4/029* (2018.02)

(58) Field of Classification Search
CPC ....... H04W 4/024; H04W 4/029; G06N 20/00
See application file for complete search history.

(56) References Cited

U.S. PATENT DOCUMENTS

| 8,810,392 | B1 | 8/2014 | Teller et al. | |
| 2007/0052534 | A1* | 3/2007 | Bird | G01S 5/0284 |
| | | | | 340/539.13 |
| 2014/0052681 | A1 | 2/2014 | Nitz et al. | |
| 2016/0006577 | A1* | 1/2016 | Logan | G05B 15/02 |
| | | | | 700/276 |
| 2017/0083821 | A1 | 3/2017 | Foerster et al. | |
| 2019/0103107 | A1* | 4/2019 | Cohen | G10L 15/22 |
| 2020/0096945 | A1* | 3/2020 | Harms | G04G 9/04 |

OTHER PUBLICATIONS

Knote et al., "Classifying Smart Personal Assistants: An Empirical Cluster Analysis", 52nd Hawaii International Conference on System Sciences, 2019.

* cited by examiner

*Primary Examiner* — Brandon J Miller
(74) *Attorney, Agent, or Firm* — Yee & Associates, P.C.

(57) ABSTRACT

Objects are located. Locations of objects in an area are tracked using a sensor system monitoring the area. Whether a user is performing an object search in the area is determined based on a sequence of actions detected by the sensor system for the user in the area. An identity of an object that is a subject of the object search by the user is inferred using the sequence of actions and a history of patterns of actions performed by the user searching for objects in response to a determination that the user is performing the object search. The user is guided to the object using a last tracked location for the object in the locations of objects tracked by the sensor system in response to inferring identify of the object that is the subject of the object search by the user.

20 Claims, 8 Drawing Sheets

ACTION BASED OBJECT LOCATION SYSTEM

BACKGROUND

1. Field

The disclosure relates generally to an improved computer system and more specifically to a method, apparatus, system, and computer program product for aiding a user through inferring possible queries and guiding a user.

2. Description of the Related Art

A question answering system uses natural language processing to receive requests in the form of natural language statements. The question answering system attempts to provide a direct answer or a passage containing the answer instead providing a list of documents returned as a result of a query. For example, a user can make a verbal request that contains a question or a command. In response, the question answering system replies with an answer to the question or executes the command.

One example of a question answering system is a virtual assistant, which is a software agent that can perform queries in response to verbal questions or perform tasks response to verbal requests or commands. The backend of the virtual assistant can be an artificial intelligence system that implements natural language processing. A virtual assistant can interface with a user through a client device such as a smart speaker, a mobile phone or other suitable device.

SUMMARY

According to one embodiment of the present invention, a method locates objects. Locations of objects in an area are tracked by a computer system using a sensor system monitoring the area. Whether a user is performing an object search in the area is determined by the computer system based on a sequence of actions detected by the sensor system for the user in the area. An identity of an object that is a subject of the object search by the user is inferred by the computer system using the sequence of actions and a history of patterns of actions performed by the user searching for objects in response to a determination that the user is performing the object search. The user is guided to the object by the computer system using a last tracked location for the object in the locations of objects tracked by the sensor system in response to inferring an identity of the object that is the subject of the object search by the user.

According to another embodiment of the present invention an object location system comprises a computer system. The computer system tracks locations of objects in an area using a sensor system monitoring the area. The computer system determines whether a user is performing an object search in the area based on a sequence of actions detected by the sensor system for the user in the area. The computer system infers an identity of an object that is a subject of the object search by the user using the sequence of actions and a history of patterns of actions performed by the user searching for objects in response to a determination that the user is performing the object search. The computer system guides the user to the object using a last tracked location for the object in the locations of objects tracked by the sensor system in response to inferring identify of the object that is the subject of the object search by the user.

According to yet another embodiment of the present invention, a computer program product for locating objects comprises a computer-readable-storage media with first program code, second program code, third program code, and fourth program code stored on the computer-readable storage media. First program code is run to track locations of objects in an area using a sensor system monitoring the area. Second program code is run to determine whether a user is performing an object search in the area based on a sequence of actions detected by the sensor system for the user in the area. Third program code is run to infer an identity of an object that is a subject of the object search by the user using the sequence of actions and a history of patterns of actions performed by the user searching for objects in response to a determination that the user is performing the object search. Fourth program code is run to guide the user to the object using a last tracked location for the object in the locations of objects tracked by the sensor system in response to inferring identify of the object that is the subject of the object search by the user.

DETAILED DESCRIPTION

Figure 1:
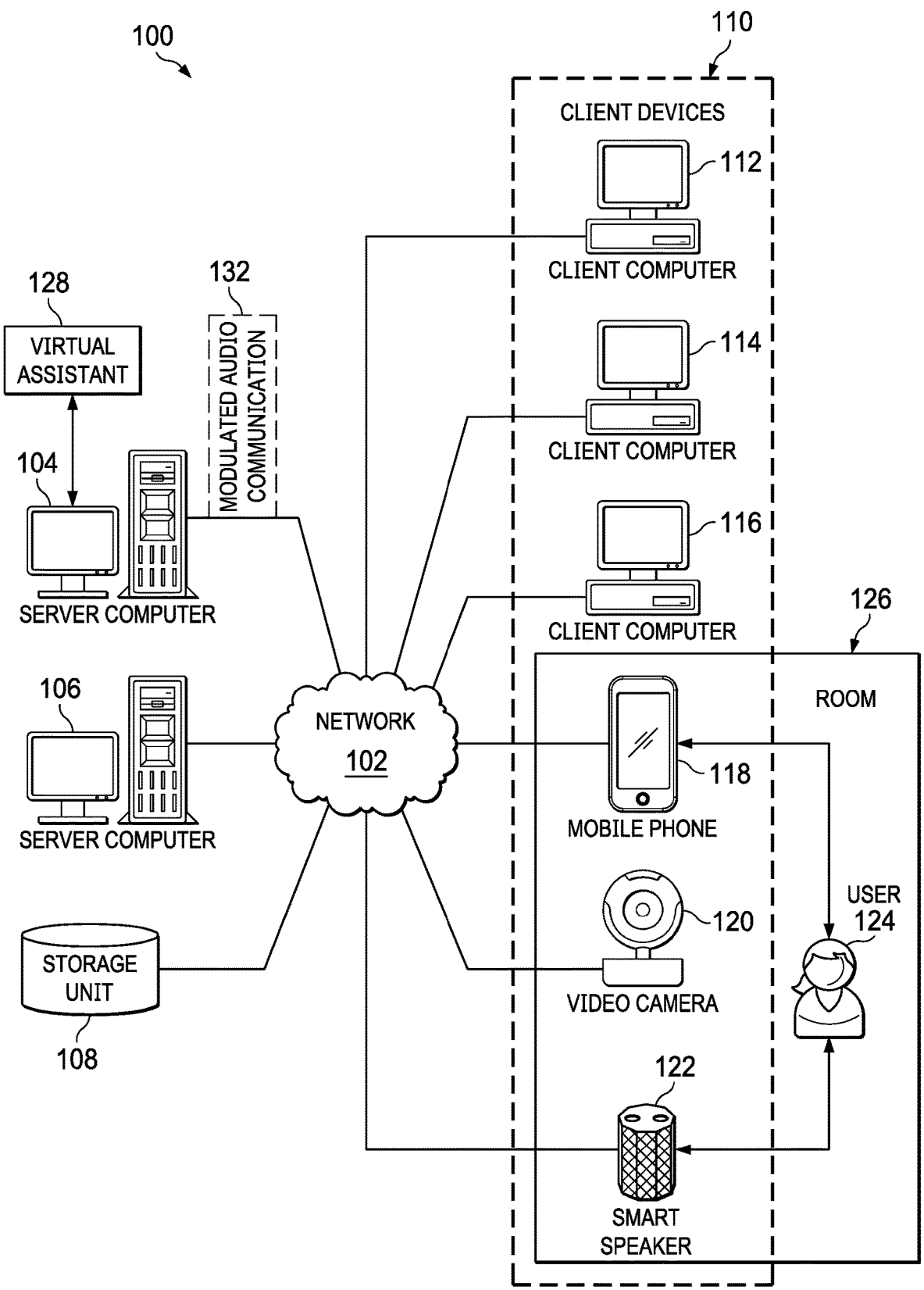
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that some instances a user may not ask a question or may be unable to ask a question. For example, the illustrative embodiments recognize and take into account user may search for an object in an area without asking a virtual assistant for help locate the object. The illustrative embodiments recognize and take account that in this situation, it is desirable to aid the user by inferring what object the user the searching for from the actions performed by the user and then guide the user to the object.

The illustrative embodiments recognize and take into account that the user behavior embodied in a sequence of actions performed by the user can be analyzed to determine that the user is searching for an object. The sequence of actions can also be analyzed to infer the identity of the object for which the user is searching for in the area.

For example, the illustrative embodiments recognize and take into account that if the user searches for a pen, the user may perform actions such as turning pages in books, opening drawers, looking for spaces between books, and other actions. In this situation, an inference can be made from the actions that the user is looking for an object. Alternatively, depending on the sequence of actions, the illustrative embodiments recognize and take account that an inference can be made that the user is searching for a power cord rather than a pen. In these situations, the illustrative embodiments recognize and take into account that a problem occurs in which time passes in searching for the object, user frustration is present in searching for an object, or both time passes and user frustration is present.

Therefore, it would be desirable to have a method, an apparatus, a system, and a computer program product that take into account at least some of the issues discussed above, as well as other possible issues. For example, it would be desirable to have a method, an apparatus, a system, and a computer program product that overcome a technical problem with reducing time, frustration, or both occurring when a user searches for an object.

Thus, illustrative embodiments provide a method, an apparatus, a system, and a computer program product for locating objects. In one illustrative example, locations of objects in an area are tracked by a computer system using a sensor system that monitors the area. Whether a user is performing an object search in the area is determined by the computer system based on a sequence of actions detected by the sensor system for the user in the area. An identity of an object that is a subject of the object search by the user is inferred by the computer system using the sequence of actions and a history of patterns of actions performed by the user searching for objects in response to a determination that the user is performing the object search. The user is guided to the object by the computer system using a last tracked location for the object in the locations of objects tracked by the sensor system in response to inferring identify of the object that is the subject of the object search by the user. In these illustrative examples, the identity of the object is an inference that can be made by the analysis of the sensor data from detecting the actions of the user.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, video camera 120, and smart speaker 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124, mobile phone 118, video camera 120, and smart speaker 122 are located in an area in the form of room 126. User 124 interacts with virtual assistant 128 in server computer 104 using a client device, such as mobile phone 118 or smart speaker 122. For example, user 124 can make a request in a verbal communication that is detected by either mobile phone 118 or smart speaker 122. The request in the verbal communication can be a question or a command in this illustrative example.

Further, virtual assistant 128 can also provide assistance when user 124 is searching for an object even when user 124 does not generate a verbal communication requesting the location of the object. In this illustrative example, virtual assistant 128 monitors actions by user 124 through sensors such as a microphone in mobile phone 118, a microphone in video camera 120, a microphone in smart speaker 122 in room 126. Virtual assistant 128 is an example of a question answering system that can implement processes for providing assistance in locating objects.

During monitoring of the actions of user 124, virtual assistant 128 can determine when user 124 is searching for an object. Additionally, virtual assistant 128 can infer what object user 124 searching for in room 126. Virtual assistant 128 can provide guidance to user 124 to locate the object in room 126. In some cases, virtual assistant 128 can suggest an alternative object if the object of interest to user 124 is not present in room 126.

Figure 2:
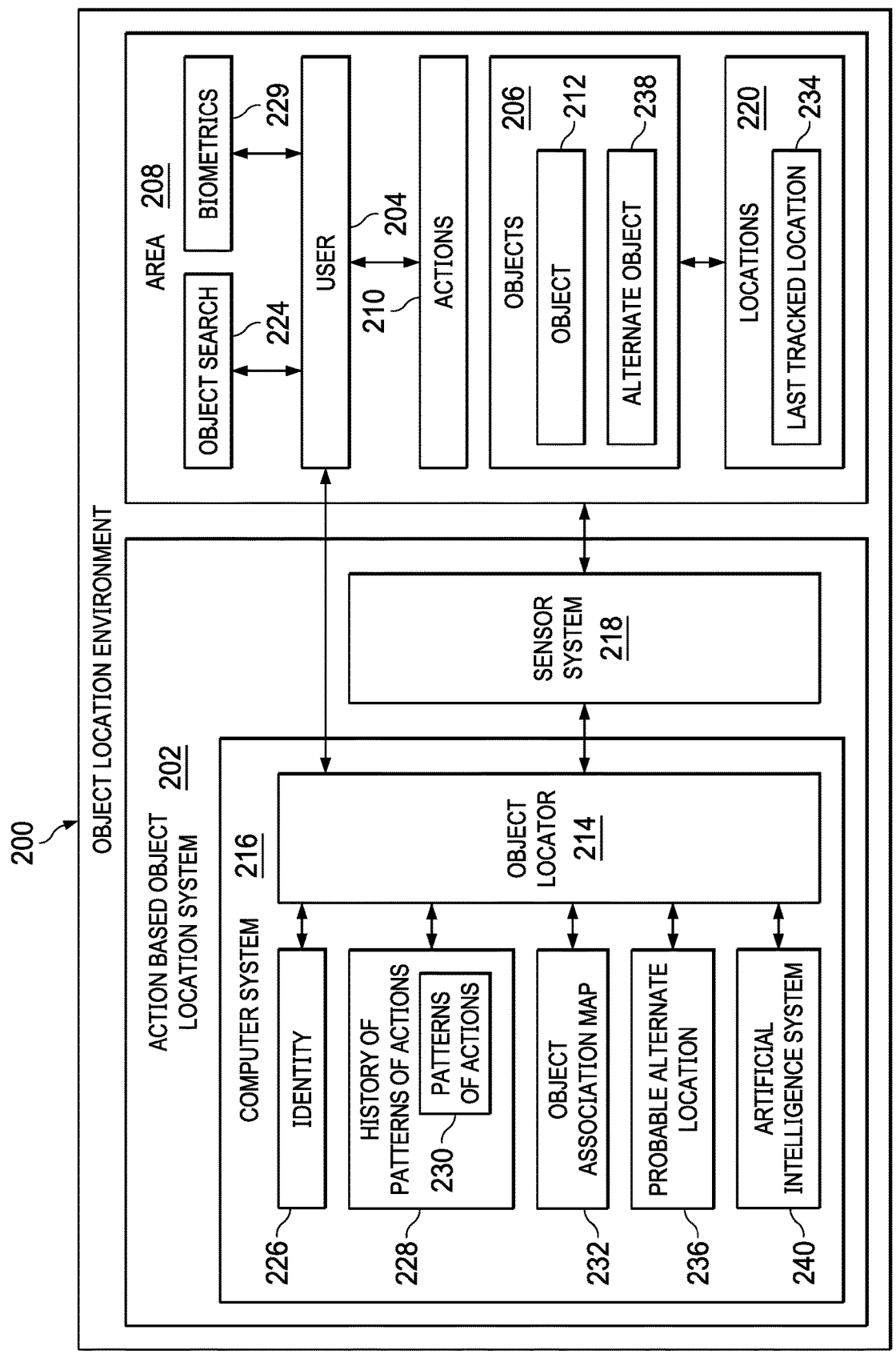
FIG. 2 is a block diagram of an object location environment in accordance with an illustrative embodiment.

With reference now to FIG. 2, a block diagram of an object location environment is depicted in accordance with an illustrative embodiment. In this illustrative example, object location environment 200 includes components that can be implemented in hardware such as the hardware shown in network data processing system 100 in FIG. 1.

Action based object location system 202 in object location environment 200 can operate to aid user 204 in locating objects 206 in area 208. In this example, user 204 is a human user and performs actions 210 in area 208. Area 208 can take a number of different forms. For example, area 208 can be a home, a living room, a kitchen, an apartment, an office, a warehouse, a factory floor, a field, a stadium, a theater, or some other area in which objects can be present.

Actions 210 can take a number of different forms. For example, actions 210 performed by user 204 can be selected from at least one of a movement that changes location, holding a posture, changing the posture, making a facial expression, making a hand movement, moving a leg, turning a head, making a smile, moving digits on a hand, opening an object, moving an object, changing a point of gaze where the user 204 is looking, or some other action that user 204 can perform. As depicted, user 204 performs a sequence of actions 210 when searching for object 212 in objects 206.

In this illustrative example, object locator 214 in computer system 216 is a component in action based object location system 202. As depicted, object locator 214 can aid user 204 in locating object 212 without user 204 making a verbal request to locate object 212. In the illustrative example, object locator 214 can be implemented in a question answering system, an open domain question answering system, a virtual assistant, or other suitable systems.

Object locator 214 can be implemented in software, hardware, firmware or a combination thereof. When software is used, the operations performed by object locator 214 can be implemented in program code configured to run on hardware, such as a processor unit. When firmware is used, the operations performed by object locator 214 can be implemented in program code and data and stored in persistent memory to run on a processor unit. When hardware is employed, the hardware may include circuits that operate to perform the operations in object locator 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 216 is a physical hardware system and includes one or more data processing systems. When more than one data processing system is present in computer system 216, those data processing systems are in communication with each other using a communications medium. The communications medium can be a network. The data processing systems can be selected from at least one of a computer, a server computer, a tablet computer, a smart speaker, a mobile phone, a tablet computer, smart glasses, or some other suitable data processing system.

In the illustrative example, object locator 214 in computer system 216 tracks locations 220 of objects 206 in area 208 using sensor system 218 monitoring area 208. Sensor system 218 is a physical hardware system and can include software. Sensor system 218 is also a component in action based object location system 202.

In this illustrative example, sensor system 218 has a number of different components. For example, sensor system 218 includes at least one of a microphone, a smart speaker, a mobile phone, a video camera, a web camera, or other suitable devices.

Object locator 214 determines whether user 204 is performing object search 224 in area 208 based on a sequence of actions 210 detected by sensor system 218 for user 204 in area 208. In this illustrative example, the sequence of actions 210 is one or more actions 210 that occur one after another over a period of time.

In the depicted example, the determination of whether user 204 is performing object search 224 can also be performed based on the sequence of actions 210 detected by sensor system 218 for user 204 in area 208 and biometrics 229 detected for the user by sensor system 218. In this illustrative example, biometrics 229 can include at least one of a heart rate, a temperature, a blood pressure, a size of an iris, or other types of biometrics that can be detected for user 204. These biometrics can be attempted using, for example, a smartwatch worn by user 204.

In determining whether user 204 is performing object search 224, object locator 214 can determine whether a correlation is present between a pattern in the sequence of actions 210 and a set of prior patterns of actions 230 in the history of patterns of actions 228 for user 204 in which user 204 performed object search 224. In this example, the pattern may include all or a subset of the sequence of actions 210. The correlation be an exact match or a match within a selected threshold level.

In the illustrative example, object locator 214 infers identity 226 of object 212 that is a subject of object search 224 by user 204 using the sequence of actions 210 and history of patterns of actions 228 performed by user 204 searching for objects 206 in response to a determination that user 204 is performing object search 224. In other words, object locator 214 can determine which object user 204 is looking for based upon analyzing a sequence of actions 210 performed by user 204. The analysis can produce probabilities for possible identities for object 212. Identity 226 can be selected based on the highest probabilities.

In inferring identity 226 of object 212 that is the subject of object search 224, object locator can infer identity 226 of object 212 that is the subject of object search 224 by user 204 using the sequence of actions 210, history of patterns of actions 228 performed by user 204 searching for objects 206, and object association map 232. In this example, object association map 232 stores associations between objects 206 in area 208. These object associations can be based on the detection of objects 206 by sensor system 218.

For example, an object association in object association map 232 can be an object such as a drawer that can store other objects such as a pen, paper, stationary and a paperclip. As another example, an object association for an object such as a book is that a book can have any one of or combination of a pen, a bookmark, or paper between the pages of the book. Another example of an object association is a paper can cover a pen or wallet under the paper. These object associations in object association map 232 can be used to predict where an object may be located.

As depicted, object locator 214 guides user 204 to object 212 using last tracked location 234 for the object 212 in locations 220 of objects 206 tracked by sensor system 218 in response to inferring identify 226 of object 212 that is the subject of object search 224 by user 204. The guidance provided by object locator 214 can be verbal, visual, a haptic, or some combination thereof.

For example, object locator 214 can guide user 204 to last tracked location 234 for object 212. Further in guiding user 204, object locator 214 can determine probable alternate location 236 for object 212 in response to object 212 being absent at last tracked location 234. In this illustrative example, probable alternative location 236 for object 212 can be determined using object association map 232. The associations of objects with each other can be used to predict where object 212 may be located when object 212 is not at last tracked location 234. Further, probable alternate location 236 can be selected from locations where object 212 has been located at other times. Object locator 214 can guide user 204 to probable alternate location 236 of object 212.

Further, object locator 214 guides user 204 to the last tracked location of an alternative object 238 in response to an absence of object 212 at last tracked location 234. For example, user 204 may be searching for a fountain pen. If the fountain pen is not present in area 208 at last tracked location 234, object locator 214 can suggest another object in place of the fountain pen, such as a gel pen in area 208.

One or more of the different operations performed by object locator 214 can be performed using artificial intelligence system 240. For example, object locator 214 can utilize artificial intelligence system 242 to determine whether user 204 is performing object search 224. As another example, object locator 214 can utilize artificial intelligence system 240 to determine identity 226 of 212 that is subject of object search 224 performed by user 204. Object locator 214 can infer identity 226 of object 212 that is the subject of the object search 224 by user 204 using the sequence of actions 210 and artificial intelligence system 240 trained using the history of patterns of actions 228 performed by user 204 searching for objects 206 in response to a determination that user 204 is performing object search 224.

Figure 3:
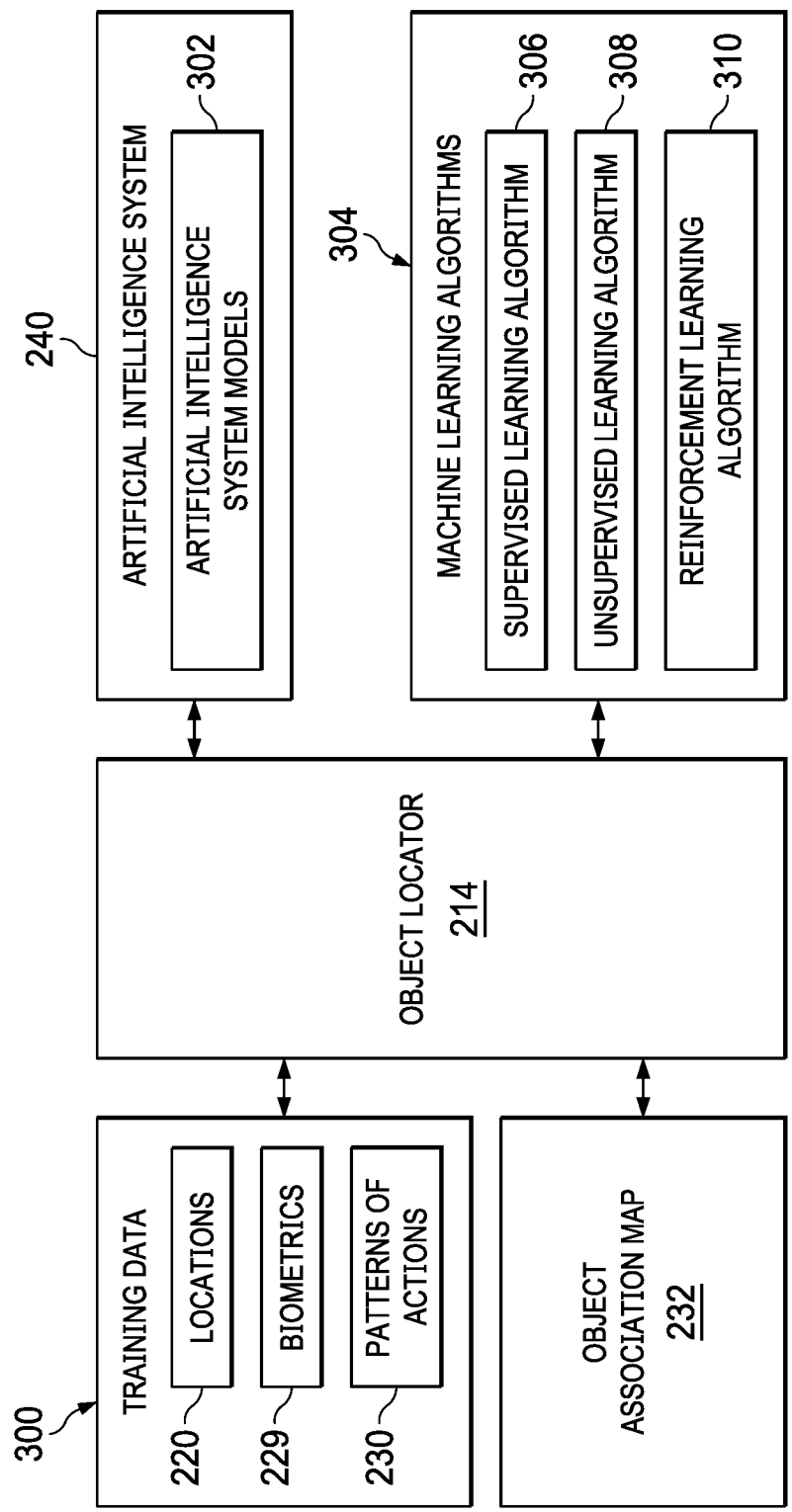
FIG. 3 is a block diagram of data flow in training an artificial intelligence system to guide a user to an object in accordance with an illustrative embodiment.

With reference next to FIG. 3, a block diagram of data flow in training an artificial intelligence system to guide a user to an object is depicted in accordance with an illustrative embodiment. In the illustrative examples, the same reference numeral may be used in more than one figure. This reuse of a reference numeral in different figures represents the same element in the different figures.

In this illustrative example, object locator 214 can train artificial intelligence system 240. For example, object locator 214 can generate training data 300 comprising the locations 220 of objects 206 identified in area 208 over time and patterns of actions 230 performed by user 204 searching for objects 206. As depicted, training data 300 can also include biometrics 229.

Further, object locator 214 can also supply object association map 232 for use in training artificial intelligence system 240. Object association map 232 can be an initial map that artificial intelligence system 240 can supplement, add to, of change as artificial intelligence system 240 is trained and during operation of artificial intelligence system 240 after training.

In this illustrative example, artificial intelligence system 240 comprises a set of artificial intelligence system models 302. When more than one artificial intelligence system model present, all the artificial intelligence system models can be trained to perform all the functions or different artificial intelligence system models can be trained to perform different subsets of the functions.

For example, one model can be trained to determine when user 204 is performing object search 224. Another model can be trained to determine identity 226 of object 212. Yet another model can be trained to guide user 204 to object 212 at last tracked location 234 or potentially to another location if object 212 is not present at last tracked location 234. Further, the guidance can also include directing user 204 to the location of an alternative object 238.

In this illustrative example, the training is performed using a set of machine learning algorithms 304. The set of machine learning algorithms can include at least one of supervised learning algorithm 306, unsupervised learning algorithm 308, reinforcement learning algorithm 310, or other suitable types of machine learning algorithms.

In the depicted example, supervised learning algorithm 306 comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning algorithm 308 is used, not all of the variables and data patterns are labeled, forcing the artificial intelligence machine model to discover hidden patterns and create labels on its own through the use of unsupervised learning algorithms. Unsupervised learning algorithm 308 has the advantage of discovering patterns in the data with no need for labeled datasets. Examples of algorithms used in unsupervised machine learning include k-means clustering, association analysis, and descending clustering.

Supervised learning algorithm 306 and unsupervised learning algorithm 308 cause an artificial intelligence model learn from a dataset, reinforcement learning methods result in the artificial intelligence model learning from interactions with an environment. Algorithms such as Q-learning are used to train the artificial intelligence model through interacting with the environment using measurable performance criteria.

With reinforcement learning algorithm 310, the set of artificial intelligence system models 302 can receive training data 300 from sensor system 222. Further, the set of artificial intelligence system models 302 can also use datasets in training data 300 when mixed machine learning techniques are used.

Figure 4:
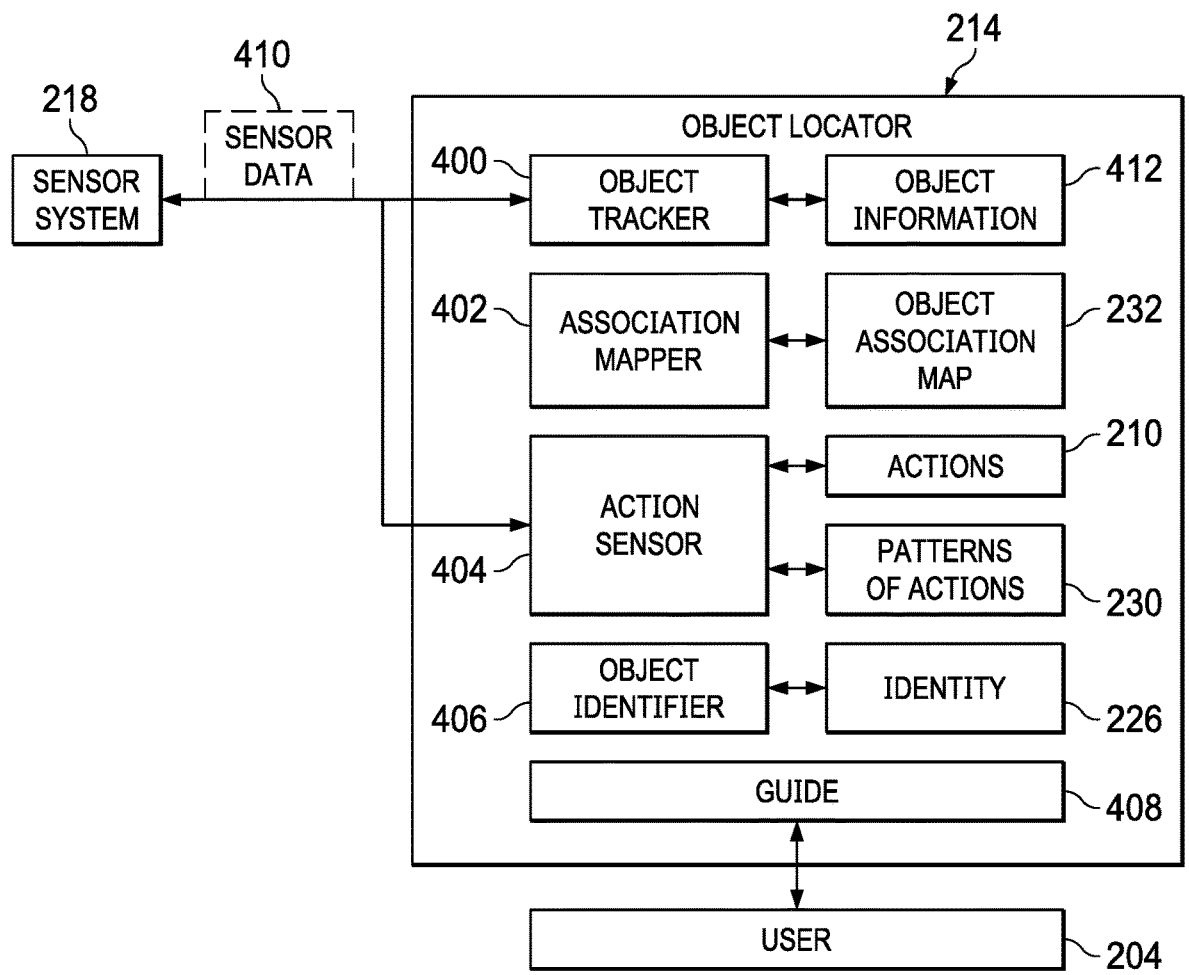
FIG. 4 is a block diagram of components in an object locator in accordance with an illustrative environment.

Turning next to FIG. 4, a block diagram of components in an object locator is depicted in accordance with an illustrative environment. This figure depicts examples of components that may be used to implement different functions in object locator 214. As depicted, object locator 214 comprises object tracker 400, association mapper 402, action sensor 404, object identifier 406, and guide 408. These different components can use artificial intelligence system 240. In other illustrative examples, the functions of these components can be implemented in artificial intelligence system 240 through training of artificial intelligence system 240.

In this illustrative example, object tracker 400 receives sensor data 410 from sensor system 218. This sensor data is used to detect the presence of objects 206 and track their locations within area 208. For example, sensor data 410 can include images and video of area 208 that includes objects 206 over a period of time.

Object tracker 400 analyzes sensor data 410 and records object information 412 about objects 206 derived from sensor data 410. Object information 412 can include at least one of an object type, an object characteristic, an object use, an identification of a user handling the object, a time of use, and locations over time, or other suitable information.

As depicted, association mapper 402 builds object association map 232. This map can be built using object information 412. In this depicted example, association mapper 402 can determine what objects can contain other objects, what objects can hold other objects, and what objects can cover other objects, as well as other associations for object association map 232. In other words, the associations can be used determine relationships between objects such as whether one object is under another object, over another object, or contained within another object. For example, a pen can be located inside a table drawer, on a table, under a chair, or inside a book. As another example, a book can hold a pen, a bookmark, a dollar bill, or paperclip.

In the illustrative example, action sensor 404 identifies a sequence of actions 210 for user 204 from sensor data 410 received from sensor system 218. For example, sensors such as video cameras, microphones, or other sensors in sensor system 218 can generate sensor data 410 such as video, images, audio, or other types of data with respect to actions 210 performed by user 204 in area 208. Further, these actions can be analyzed with respect to objects 206 that user 204 may handle or view. For example, as part of identifying a sequence of actions 210 from sensor data 410, action sensor 404 can analyze user actions continuously.

Action sensor 404 determines if the user is performing object search 224 from the sequence of actions 210 by comparing the sequence of actions 210 to patterns of actions 230 previously detected for user 204. Patterns of actions 230 can include user 204 searching through every page of multiple books, corners of books, drawers, and other actions. The pattern of actions also can be where user 204 moves to within area 208 as part of performing sequence of actions 210.

With these patterns, the state of user 204 can be determined. For example, when actions 210 for user 204 are determined to indicate that user 204 is performing object search 224, user 204 is in a search state. When actions 210 do not indicate that user 204 is performing object search 224, user 204 is considered to be in a normal state. Although two states are described in this illustrative example, one or more other states can be used in addition to the normal state and the search state. For example, different search states can be present based on the urgency of the search.

Object identifier 406 infers identity 226 of object 212 that is the subject of object search 224. This determination can be made using object association map 232 and the sequence of actions 210 detected for user 204. For example, object identifier 406 can select a set of objects 206 and assign a likelihood that user 204 is looking for a particular object in the set of objects 206. For example, if user 204 is opening table drawers, it is more likely that user 204 is searching for a pen or a power cord as opposed to a cooking pan.

In the illustrative example, the inference can be made by artificial intelligence system 240. The identity of the object can be an inference made by the analysis of the sensor data generated from detecting the actions of the user. The inference can be made using fuzzy logic, a Bayesian system, a statistical algorithm, or some other suitable system or process.

When artificial intelligence system 240 is used, the outcomes of prior searches by user 204 can be used by artificial intelligence system 242 perform repetitive inference and learning with respect to different objects that can be searched for by user 204. The result of a search can be identified from analyzing user 204 at the end of the sequence of actions 210. For example, facial expressions, words spoken, gestures, or other information about user 204 can be used to determine whether the search was successful particular object.

Further, the timing of object searches can also be used to determine the probability of which objects may be the subject of an object search. For example, the timing may be prior to leaving the house. The reason for the search can be looking for a pen or paper. This reason can be identified from the success of object searches and the timing of those object searches. With this type of observation and using reinforcement learning algorithm 310, artificial intelligence system 240 can analyze at least one of facial patterns in actions 210, movement patterns in actions 210, biometric patterns in biometrics 229 for user 204, or other suitable information for object searches.

As depicted, guide 408 provides guidance to user 204 to object 212 identified as the object of object search 224. In this illustrative example, guide 408 can provide guidance to the user using at least one of audio guidance or visual guidance.

The audio guidance can be verbal instructions on where to look, a location of the object, or other types of guidance. The visual guidance can be a map with the location of object 212 graphically indicated on the map. The visual guidance can also be words such as "look under the family room chair for the pen". This guidance is to last tracked location 234 of object 212. If object 212 is not found at last tracked location 234, guide 408 can predict or determine the probability of where object 212 is located. Further, guide 408 can provide guidance to find an alternative object.

In one illustrative example, one or more technical solutions are present that overcome a technical problem with reducing time, frustration, or both occurring when a user searches for an object. In the illustrative example, one or more technical solutions provides an ability for a computer system to determine when a user is searching for an object. In the illustrative example, one or more technical solutions enable inferring the identity of the object being searched for by the user. As a result, one or more technical solutions may provide a technical effect providing guidance to user to locate an object without the user verbally or otherwise affirmatively requesting assistance in locating the object. Instead, one or more technical solutions enable determining when a user is searching for an object by analyzing actions performed by the user.

Computer system 216 can be configured to perform at least one of the steps, operations, or actions described in the different illustrative examples using software, hardware, firmware or a combination thereof. As a result, computer system 216 operates as a special purpose computer system in which object locator 214 in computer system 216 enables guiding a user to locate an object without the user requesting the location of the object. In particular, object locator 214 transforms computer system 216 into a special purpose computer system as compared to currently available general computer systems that do not have object locator 214.

In the illustrative example, the use of object locator 214 in computer system 216 integrates processes into a practical application for method to guide a user to an object without the user affirmatively or explicitly asking or requesting the location of an object in a manner that increases the performance of computer system 216. In other words, object locator 214 in computer system 216 is directed to a practical application of processes integrated into object locator 214 in computer system 216 that determines when a user is looking for an object by using actions performed by the user. The process can infer what object the user searching for from the actions performed by the user. In this illustrative example, object locator 214 in computer system 216 can locate the object for the user through tracking the locations of objects within an area over time with a sensor system. When an object is identified as being the targeted search, the user can be guided to the last tracked location for the object by object locator 214.

In this manner, object locator 214 in computer system 216 provides a practical application of a process for guiding the user to an object such that the functioning of computer system 216 is improved. For example, improvement includes an ability to anticipate when a user is looking for a particular object and guide the user to that object without the user having to request assistance.

The illustration of object location environment 200 and different components in FIGS. 2-4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although object locator 214 is shown as accessing or using artificial intelligence system 240, one or more functions in object locator 214 can be implemented within artificial intelligence system 240. For example, at least one of object tracker 400, association mapper 402, action sensor 404, object identifier 406, or guide 408 can be implemented in artificial intelligence system 240 through training of artificial intelligence system 240 to perform the functions for these components using the set of machine learning algorithms 304 in FIG. 3. As another example, object locator 214 may not include association mapper 402 in some illustrative examples, In yet another illustrative example, area 208 can include two or more locations. In other words, area 208 does not have to be continuous. For example, area 208 can include a study in a house and an office in office building. Further, object locator 214 can provide assistance to one or more users in addition to or in place of user 204. Further, object locator 214 can aid users in one or more areas in addition or in place of area 208.

Figure 5:
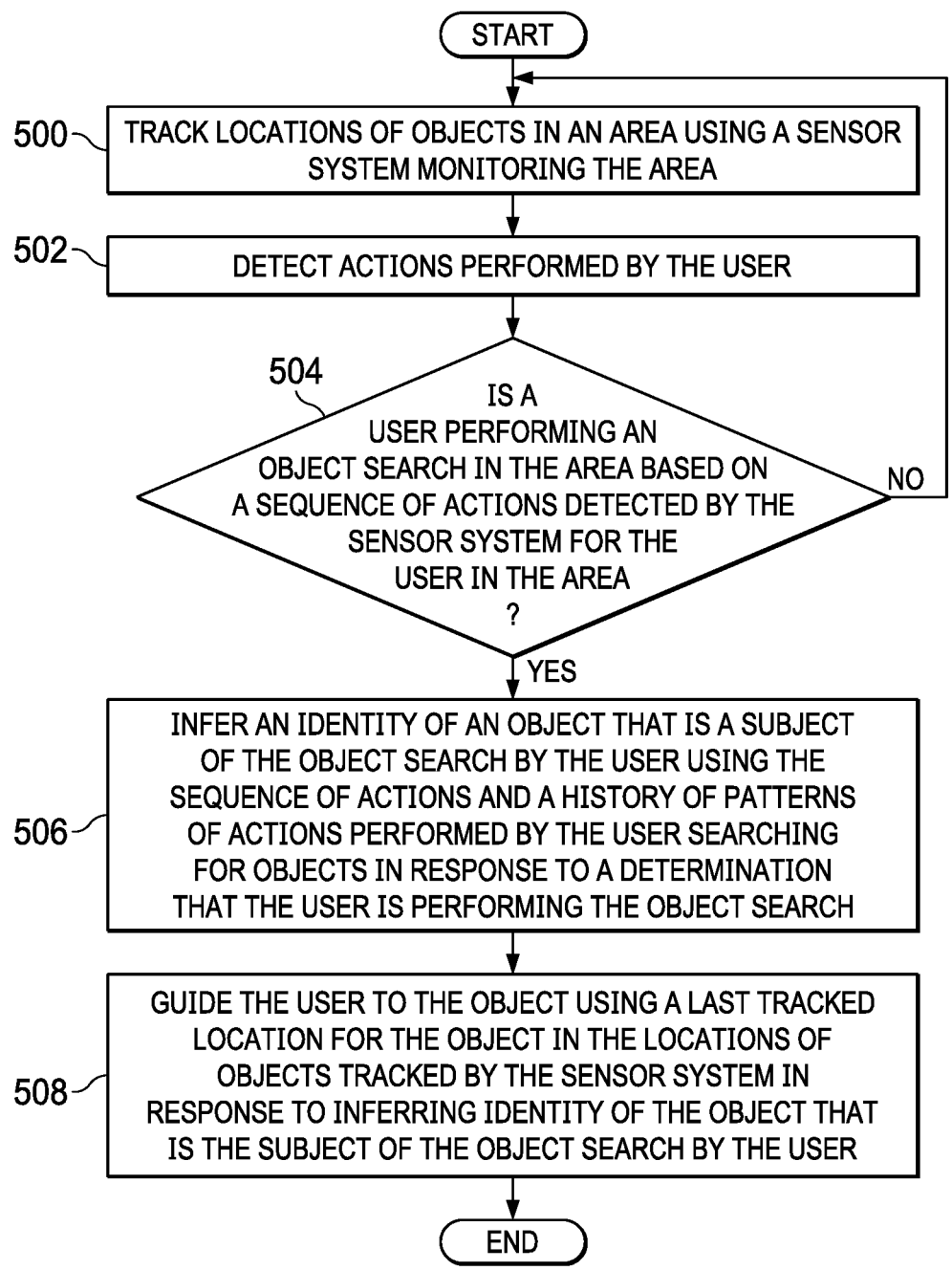
FIG. 5 is a flowchart of a process for locating an object in accordance with an illustrative embodiment.

Turning next to FIG. 5, a flowchart of a process for locating an object is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, the process can be implemented in object locator 214 in computer system 216 in FIG. 2. This process enables locating an object for user without the user requesting assistance in locating the object. This process anticipates when the user is searching for a particular object and provides guidance to the user to locate the object.

The process begins by tracking locations of objects in an area using a sensor system monitoring the area (step 500). The process detects actions performed by the user (step 502). The process determines whether a user is performing an object search in the area based on a sequence of actions detected by the sensor system for the user in the area (step 504).

If the user is performing object search, the process infers an identity of an object that is a subject of the object search by the user using the sequence of actions and a history of patterns of actions performed by the user searching for objects in response to a determination that the user is performing the object search (step 506). In step 506, the process determines what object the user is looking for in performing an object search.

The process guides the user to the object using a last tracked location for the object in the locations of objects tracked by the sensor system in response to inferring identify of the object that is the subject of the object search by the user (step 508). The process terminates thereafter. With reference again to step 502, if the user is not performing object search, the process returns to step 500.

Figure 6:
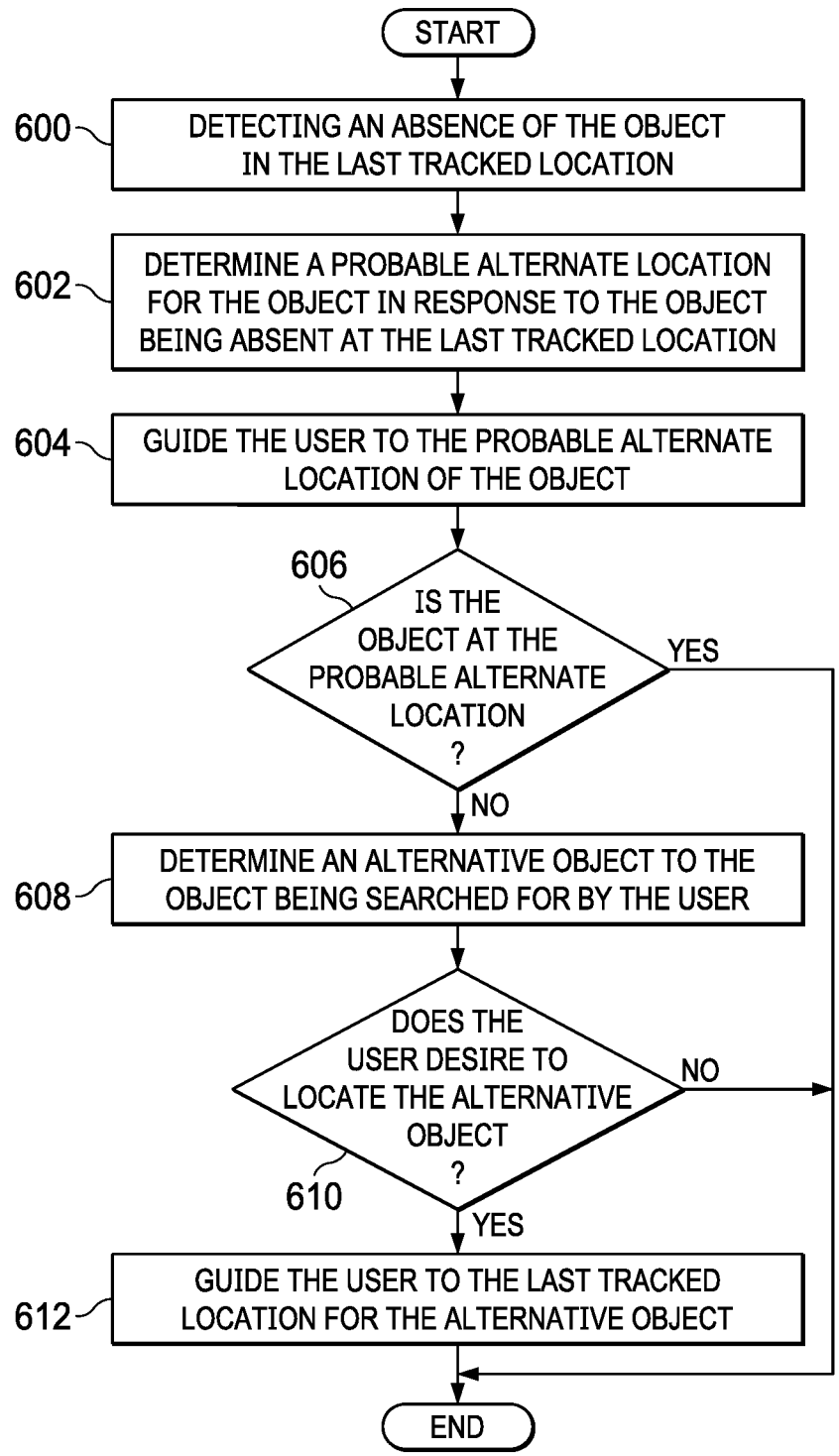
FIG. 6 is a flowchart of a process for locating an object absent from a last tracked location in accordance with an illustrative embodiment.

Turning next to FIG. 6, a flowchart of a process for locating an object absent from a last tracked location is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in object locator 214 in computer system 216 in FIG. 2. This process can be initiated when the object is absent from the last tract location of the object.

The process begins by detecting an absence of the object at the last tracked location (step 600). The absence can be detected by a sensor system monitoring user actions. When the user is guided to last tracked location and does not located the object, the sensor system can record this event which indicates the object is absent at the last tracked location.

The process determines a probable alternate location for the object in response to the object being absent at the last tracked location (step 602). The process guides the user to the probable alternate location of the object (step 604).

A determination is made as to whether the object is at the probable alternate location (step 606). If the object is at the optimal alternate location, process terminates.

Otherwise, the process determines an alternative object to the object being searched for by the user (step 608).

The process determines whether the user desires to locate the alternative object (step 610). In step 610, the user may be prompted with an option to locate an alternative object. For example, if the user is searching a blue pen, and the blue pen is absent in the area, the process may determine that a black pen is in the area and prompt the user as to whether the user desires to locate the black pen.

If the user desires to locate the alternative object, the process guides the user to the last tracked location for the alternative object (step 612). The process terminates thereafter. This process can be reinitiated if the alternative object is not at the last tracked location. With reference again to step 610, if the user does not desire to locate the alternative object, the process also terminates.

Figure 7:
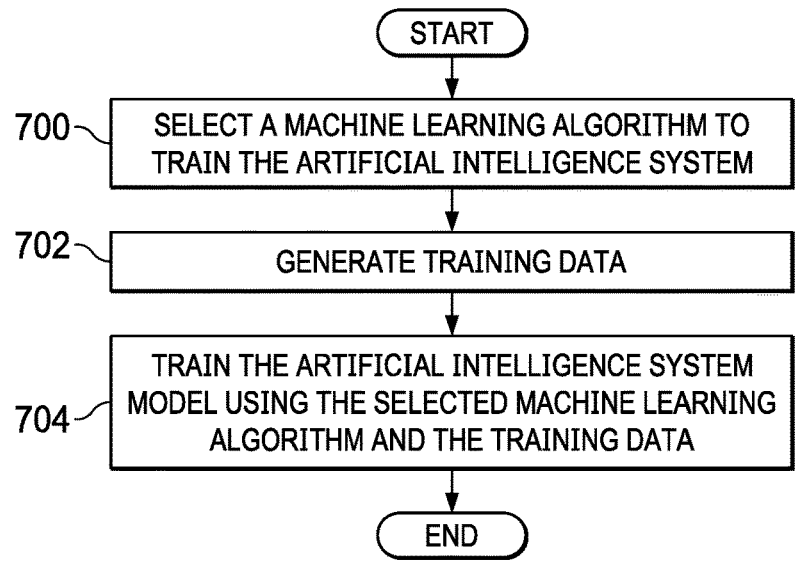
FIG. 7 is a flowchart of a process for training in artificial intelligence system to guide users to objects in accordance with an illustrative embodiment.

Turning next to FIG. 7, a flowchart of a process for training in artificial intelligence system to guide users to objects is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in object locator 214 in computer system 216 in FIG. 2. This process can be initiated when the object is absent from the last tract location of the object.

The process begins by selecting a machine learning algorithm to train the artificial intelligence system (step F700). The machine learning algorithm can be selected from various types of available machine learning algorithms such as a supervised learning algorithm, and unsupervised learning algorithm, and a reinforcement learning algorithm.

The process generates training data (step 702). In step 702, the training data can be generated from sensor data received a sensor system. In this step, a dataset can be generated when the machine learning algorithm is a supervised learning algorithm or an unsupervised learning algorithm. When the machine learning algorithm is a reinforcement learning algorithm, the training data can be sensor data received directly from a sensor system such that the artificial intelligence system model receives data from the environment through a sensor system. The reinforcement learning algorithm can provide performance criteria.

The process then trains the artificial intelligence system model using the selected machine learning algorithm and the training data (step 704). The process terminates thereafter.

This process can be repeated any number of times to increase the accuracy of the artificial intelligence system model. In one illustrative example, the training can be performed continuously while the artificial intelligence system model provides guidance to users in locating objects. In this example, the results of the guidance can be detected from monitoring the user. As a result, feedback is provided to the artificial intelligence system model that allows increasing accuracy in which guidance can be provided to the user to locate an object. This location can be the last tracked location or a probable alternate location. Further, the training can also increase the accuracy in predicting what is a suitable alternative object when the object identified as being the subject of the object search is not present in the area being searched by the user.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 8:
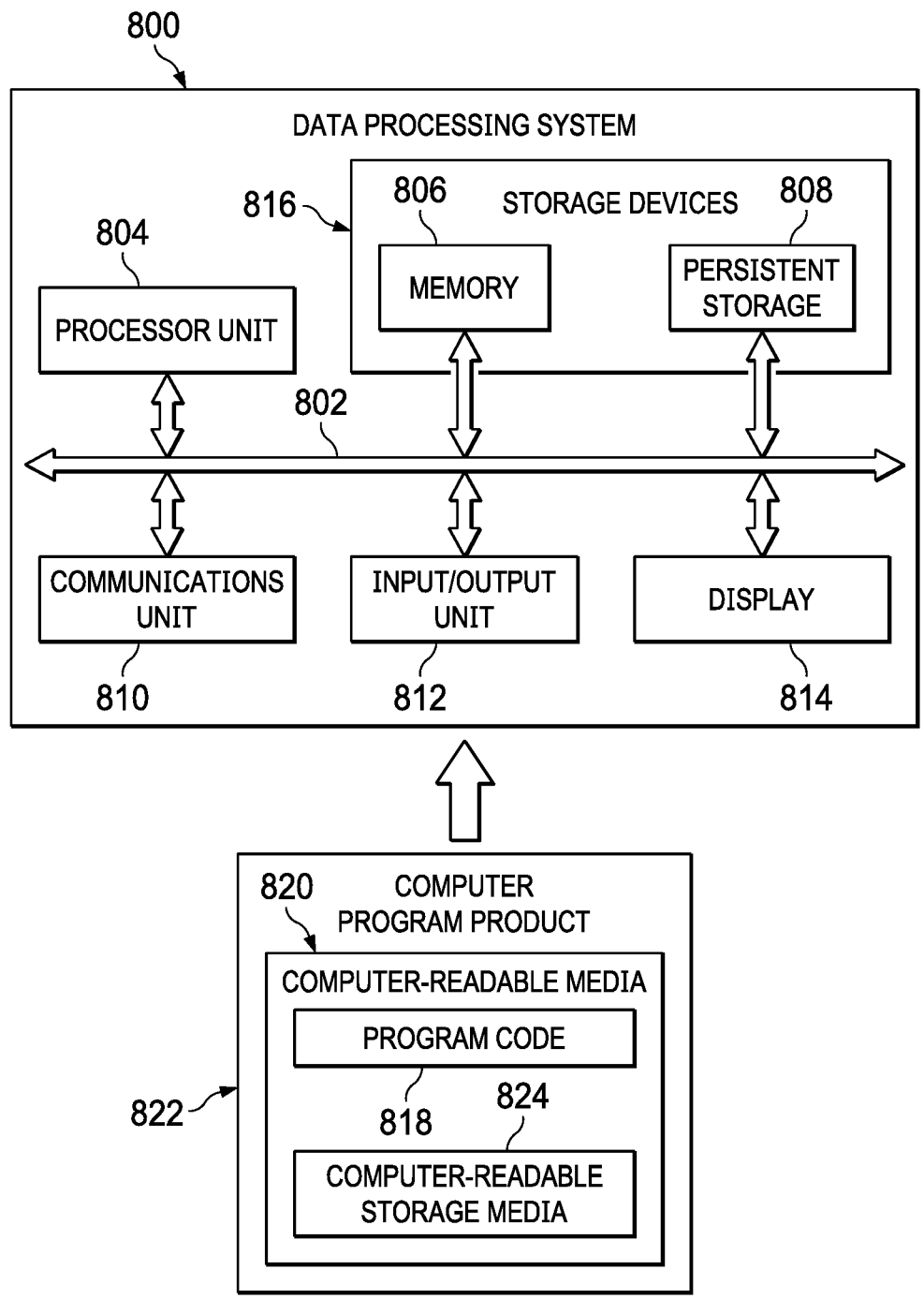
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, client devices 110, in FIG. 1. Data processing system 800 can also be used to implement computer system 216 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

Figure 9:
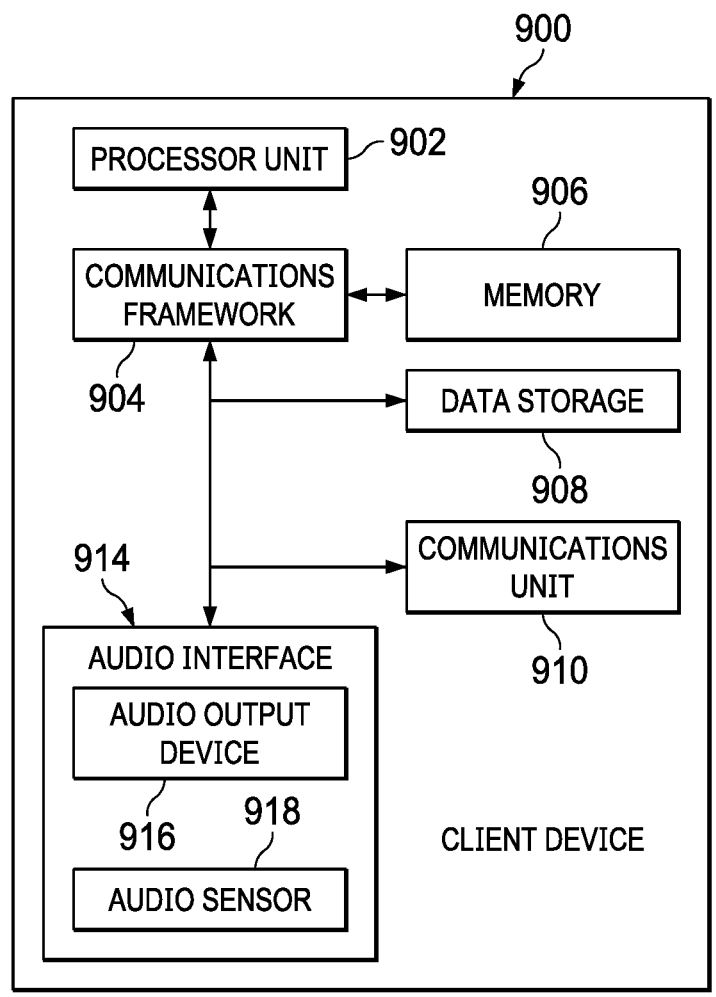
FIG. 9 is a block diagram of a client device in accordance with an illustrative embodiment.

With reference to FIG. 9, a block diagram of a client device is depicted in accordance with an illustrative embodiment. Client device 900 is an example of one manner in which a client device, such as smart speaker 122 in FIG. 1 can be implemented for facilitating audio communications. In this illustrative example, client device 900 includes physical hardware components such as processor unit 902, communications framework 904, memory 906, data storage 908, communications unit 910, and audio interface 914.

Communications framework 904 allows different components in client device 900 to communicate with each other when connected to communications framework 904. Communications framework 904 is a bus system in this illustrative example.

Processor unit 902 processes program code for software loaded into memory 906. Processor unit 902 include one or more processors. For example, processor unit 902 can be selected from at least one of a multicore processor, a central processing unit (CPU), a graphics processing unit (GPU), a physics processing unit (PPU), a digital signal processor (DSP), a network processor, or some other suitable type of processor.

Memory 906 is connected to processor unit 902 through communications framework 904. As depicted, memory 906 can include at least one of a random access memory (RAM), a read-only memory (ROM), a static random access memory (SRAM), a dynamic random access memory (DRAM), or other suitable types of memory devices or circuits.

As depicted, data storage 908 is connected to communications framework 904 and can store data, program code, or other information. Instructions in program code can be loaded from data storage 908 into memory 906 for processing by processor unit 902. Data storage 908 can comprise at least one of a hard disk drive, a flash drive, a solid-state disk drive, an optical drive, or some other suitable type of data storage device or system.

In this illustrative example, communications unit 910 provides for communications with other data processing systems or devices. In these illustrative examples, communications unit 910 includes at least one of a network interface card, a wireless communications device, a universal serial bus port, or other suitable device.

In this illustrative example, audio interface 914 is connected to communications framework 904. As depicted, audio interface 914 can include hardware, software, or both that control the operation of audio output device 916 and audio sensor 918 in audio interface 914. Audio output device 916 is hardware that is capable of generating audio signals for output and can include at least one of a paper cone speaker, an audio transducer, a line out jack, a digital to analog converter (DAC), or other type of audio device. Audio sensor 918 is hardware that is capable of detecting sounds. For example, audio sensor 918 can be comprised of at least one of a microphone, a fiber-optic microphone, a laser microphone, a microelectronic mechanical system (MEMS), a transducer, a line input jack and associated circuitry, or an analog to digital converter (ADC).

The illustration of client device 900 is an example of one manner in which client device 900 can be implemented. This illustration is not meant to limit the manner in which client device 900 can be embodied in other illustrative examples. For example, audio output device 916 and audio sensor 918 can be implemented as a single component. When audio output device 916 is a loud speaker, audio sensor 918 can also be implemented using the loud speaker.

Thus, the illustrative embodiments include a method, an apparatus, a system, and a computer program product for locating objects. Locations of objects in an area are tracked using a sensor system monitoring the area. Whether a user is performing an object search in the area is determined based on a sequence of actions detected by the sensor system for the user in the area. An identity of an object that is a subject of the object search by the user is inferred using the sequence of actions and a history of patterns of actions performed by the user searching for objects in response to a determination that the user is performing the object search. The user is guided to the object using a last tracked location for the object in the locations of objects tracked by the sensor system in response to inferring identify of the object that is the subject of the object search by the user.

In the illustrative examples, object locator 214 can tell a user where an object is located without the user asking object locator 214 for assistance. Object locator 214 can reduce time and frustration in searching for an object by aiding the user searching for an object even though user has not requested help to fine the object.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for locating objects, the method comprising:
   tracking, by a computer system, locations of objects in an area using a sensor system monitoring the area;
   determining, by the computer system, whether a user is performing an object search in the area based on a sequence of actions detected by the sensor system for the user in the area;
   inferring, by the computer system, an identity of an object that is a subject of the object search by the user using the sequence of actions and a history of patterns of actions performed by the user searching for objects in response a determination that the user is performing the object search; and
   guiding, by the computer system, the user to the object using a last tracked location for the object in the locations of objects tracked by the sensor system in response to inferring the identity of the object that is the subject of the object search by the user.

2. The method of claim 1, wherein guiding, by the computer system, the user to the object using the last tracked location for the object in the locations of objects tracked by the sensor system in response to inferring identify of the object that is the subject of the object search by the user comprises:
   guiding, by the computer system, the user to the last tracked location for the object.

3. The method of claim 2, wherein guiding, by the computer system, the user to the object using the last tracked location for the object in the locations of objects tracked by the sensor system in response to inferring identify of the object that is the subject of the object search by the user further comprises:
   determining, by the computer system, a probable alternate location for the object in response to the object being absent at the last tracked location; and
   guiding, by the computer system, the user to the probable alternate location of the object.

4. The method of claim 2 further comprising:
   guiding, by the computer system, the user to the last tracked location of an alternative object in response to an absence of the object at the last tracked location.

5. The method of claim 1, wherein determining, by the computer system, whether the user is performing the object search in the area based on the sequence of actions detected by the sensor system for the user in the area comprises:
   determining, by the computer system, whether a correlation is present between a pattern in the sequence of actions and a set of patterns of actions in the history of patterns of actions for the user in which the user performed the object search.

6. The method of claim 1, wherein inferring, by the computer system, the identity of the object that is the subject of the object search by the user using the sequence of actions and the history of patterns of actions performed by the user searching for objects in response to the determination that the user is performing the object search comprises:
   inferring, by the computer system, the identity of the object that is the subject of the object search by the user using the sequence of actions and an artificial intelligence system trained using the history of patterns of actions performed by the user searching for objects in response to the determination that the user is performing the object search.

7. The method of claim 6, wherein the artificial intelligence system is trained using the history of patterns of actions performed by the user searching for objects and a set of a machine learning algorithms are selected from at least one of a supervised learning, unsupervised learning, or reinforcement learning.

8. The method of claim 1, wherein, by the computer system, inferring the identity of the object that is the subject of the object search by the user using the sequence of actions and the history of patterns of actions performed by the user searching for objects in response to the determination that the user is performing the object search comprises:
   inferring, by the computer system, the identity of the object that is the subject of the object search by the user using the sequence of actions, the history of patterns of actions performed by the user searching for objects, and an object association map in response to the determination that the user is performing the object search.

9. The method of claim 1 further comprising:
   detecting, by the computer system, biometrics for the user using the sensor system while the user performs the sequence of actions;
   wherein determining, by the computer system, whether the user is performing the object search in the area based on the sequence of actions detected by the sensor system for the user in the area comprises:
   determining, by the computer system, determining, by the computer system, whether the user is performing the object search in the area based on the sequence of actions detected by the sensor system for the user in the area and the biometrics detected for the user.

10. The method of claim 1 further comprising:
    generating training data comprising the locations of objects in the area over time and the patterns of actions performed by the user searching for objects; and
    training with the training data.

11. The method of claim 1, wherein the tracking, determining, inferring, and guiding steps are performed by a virtual assistant through a client device in the computer system.

12. The method of claim 1, wherein the area is selected from a home, a living room, a kitchen, an apartment, an office, a field, a stadium, and a theater.

13. An object location system comprising:
 a computer system that tracks locations of objects in an area using a sensor system monitoring the area; determines whether a user is performing an object search in the area based on a sequence of actions detected by the sensor system for the user in the area; infers an identity of an object that is a subject of the object search by the user using the sequence of actions and a history of patterns of actions performed by the user searching for objects in response to a determination that the user is performing the object search; and guides the user to the object using a last tracked location for the object in the locations of objects tracked by the sensor system in response to inferring identify of the object that is the subject of the object search by the user.

14. The object location system of claim 13, wherein guiding, by the computer system, the user to the object using the last tracked location for the object in the locations of objects tracked by the sensor system in response to inferring identify of the object that is the subject of the object search by the user comprises:
 guiding, by the computer system, the user to the last tracked location for the object.

15. The object location system of claim 14, wherein guiding, by the computer system, the user to the object using the last tracked location for the object in the locations of objects tracked by the sensor system in response to inferring identify of the object that is the subject of the object search by the user further comprises:
 determining, by the computer system, a probable alternate location for the object in response to the object being absent at the last tracked location; and
 guiding, by the computer system, the user to the probable alternate location of the object.

16. The object location system of claim 14 further comprising:
 guiding, by the computer system, the user to the last tracked location of an alternative object in response to an absence of the object at the last tracked location.

17. The object location system of claim 13, wherein inferring, by the computer system, the identity of the object that is the subject of the object search by the user using the sequence of actions and the history of patterns of actions performed by the user searching for objects in response to the determination that the user is performing the object search comprises:
 inferring, by the computer system, the identity of the object that is the subject of the object search by the user using the sequence of actions and an artificial intelligence system trained using the history of patterns of actions performed by the user searching for objects in response to the determination that the user is performing the object search.

18. A computer program product for locating objects, the computer program product comprising:
 a computer-readable storage media;
 first program code, stored on the computer-readable storage media, for tracking locations of objects in an area using a sensor system monitoring the area;
 second program code, stored on the computer-readable storage media, for determining whether a user is performing an object search in the area based on a sequence of actions detected by the sensor system for the user in the area;
 third program code, stored on the computer-readable storage media, for inferring an identity of an object that is a subject of the object search by the user using the sequence of actions and a history of patterns of actions performed by the user searching for objects in response to a determination that the user is performing the object search; and
 fourth program code, stored on the computer-readable storage media, for guiding the user to the object using a last tracked location for the object in the locations of objects tracked by the sensor system in response to inferring identify of the object that is the subject of the object search by the user.

19. The computer program product of claim 18, wherein the fourth program code comprises:
 program code, stored on the computer-readable storage media, for guiding the user to the last tracked location for the object;
 program code, stored on the computer-readable storage media, for determining a probable alternate location for the object in response to the object being absent at the last tracked location; and
 program code, stored on the computer-readable storage media, for guiding the user to the probable alternate location of the object.

20. The computer program product of claim 19 further comprising:
 fifth program code, stored on the computer-readable storage media, for guiding the user to the last tracked location of an alternative object in response to an absence of the object at the last tracked location.

\* \* \* \* \*